W. H. BAUR.
CHECK PRINTER AND RECORDER.
APPLICATION FILED MAY 14, 1908.

935,453.

Patented Sept. 28, 1909.
8 SHEETS—SHEET 1.

WITNESSES
James F. Duhamel
Geo. Ackman Jr.

INVENTOR,
William H. Baur.
BY
Victor J. Evans
ATTORNEY

W. H. BAUR.
CHECK PRINTER AND RECORDER.
APPLICATION FILED MAY 14, 1908.

935,453.

Patented Sept. 28, 1909.
8 SHEETS—SHEET 7.

WITNESSES
James T. Duhamel.
Geo. Ackman Jr.

INVENTOR,
William H. Baur,
BY Victor J. Evans
ATTORNEY

W. H. BAUR.
CHECK PRINTER AND RECORDER.
APPLICATION FILED MAY 14, 1908.

935,453.

Patented Sept. 28, 1909.
8 SHEETS—SHEET 8.

WITNESSES
James P. Duhamel,
Geo Ackman

INVENTOR,
William H. Baur,
BY Victor J. Evans
ATTORNEY

UNITED STATES PATENT OFFICE.

WILLIAM H. BAUR, OF NEW YORK, N. Y.

CHECK PRINTER AND RECORDER.

935,453.  Specification of Letters Patent.  Patented Sept. 28, 1909.

Application filed May 14, 1908. Serial No. 432,894.

*To all whom it may concern:*

Be it known that I, WILLIAM H. BAUR, a citizen of the United States, residing at New York, in the county of New York and State of New York, have invented new and useful Improvements in Check Printers and Recorders, of which the following is a specification.

Figure 1:
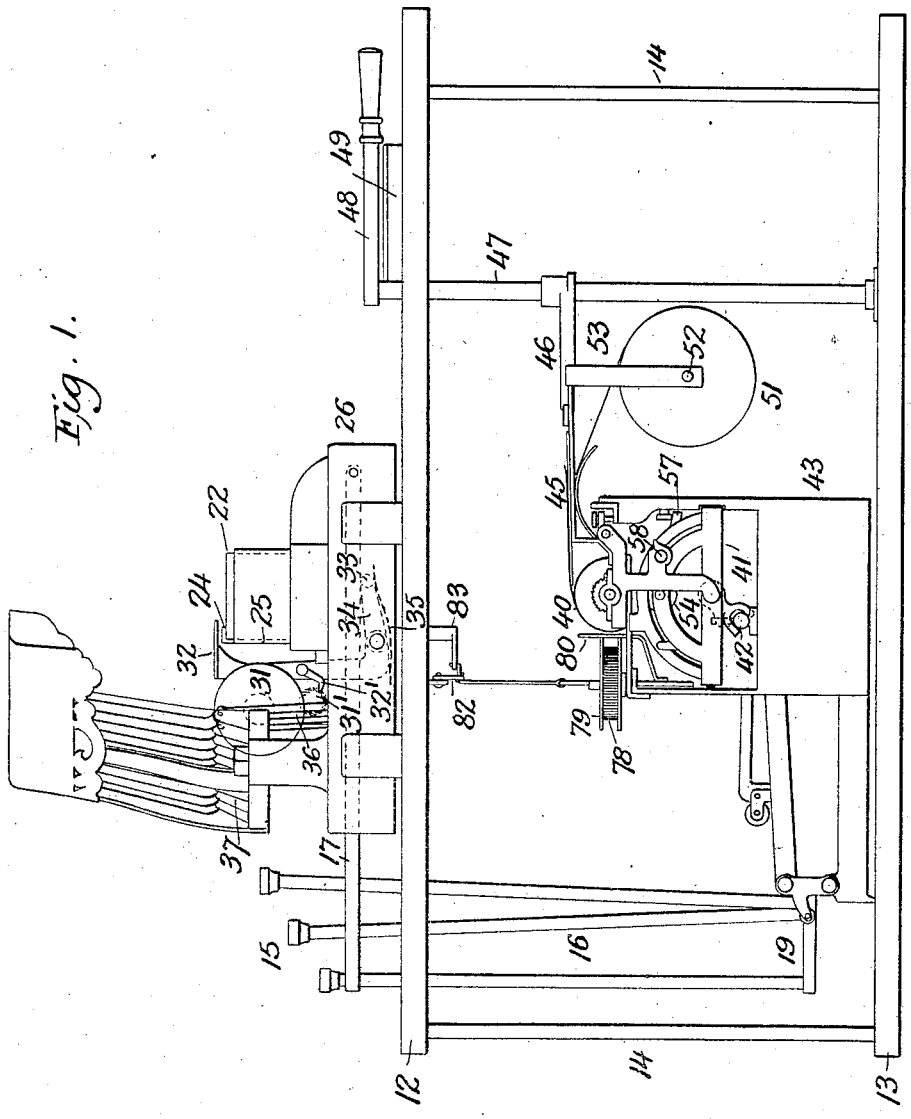
Figure 2:
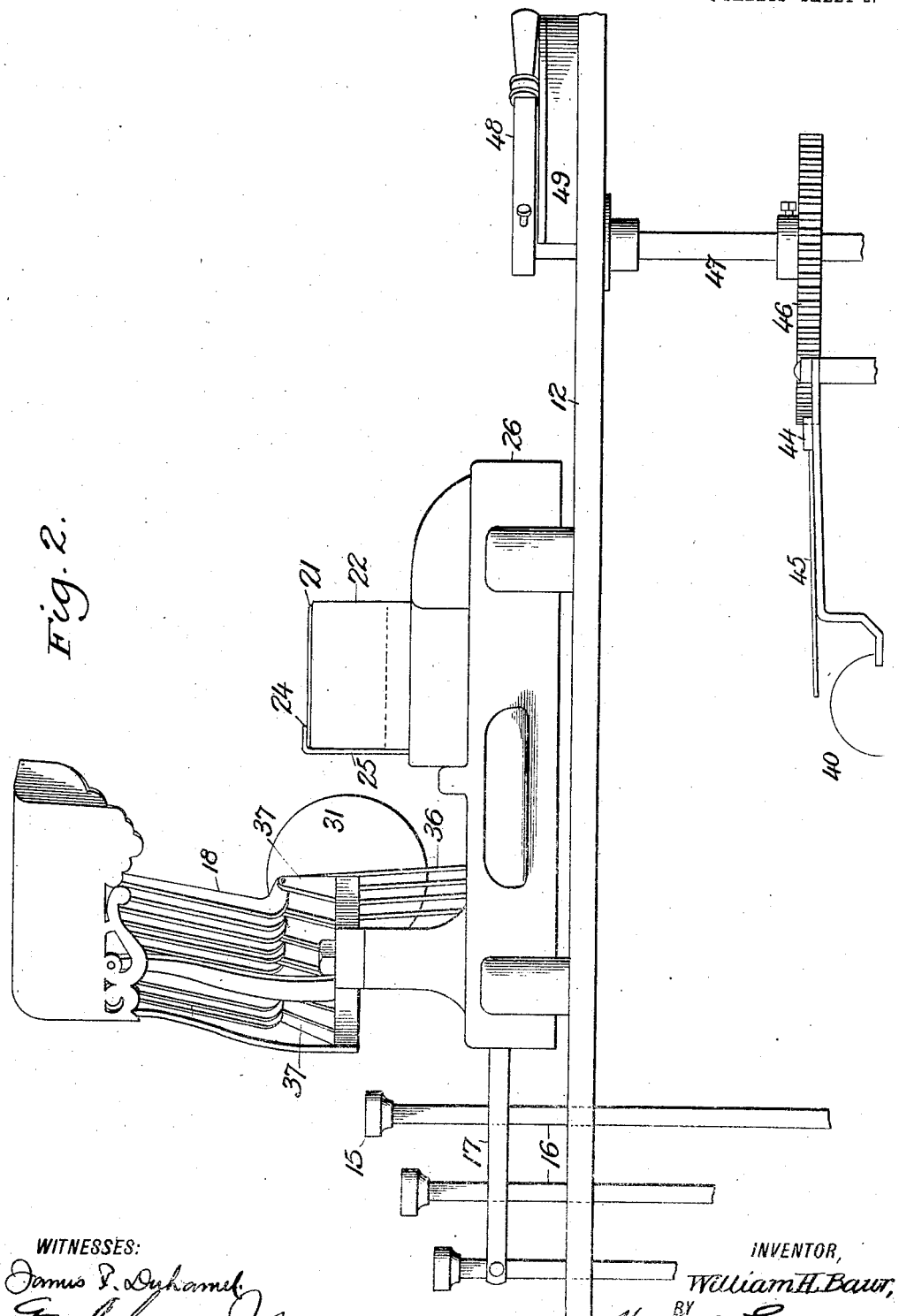
Figure 3:
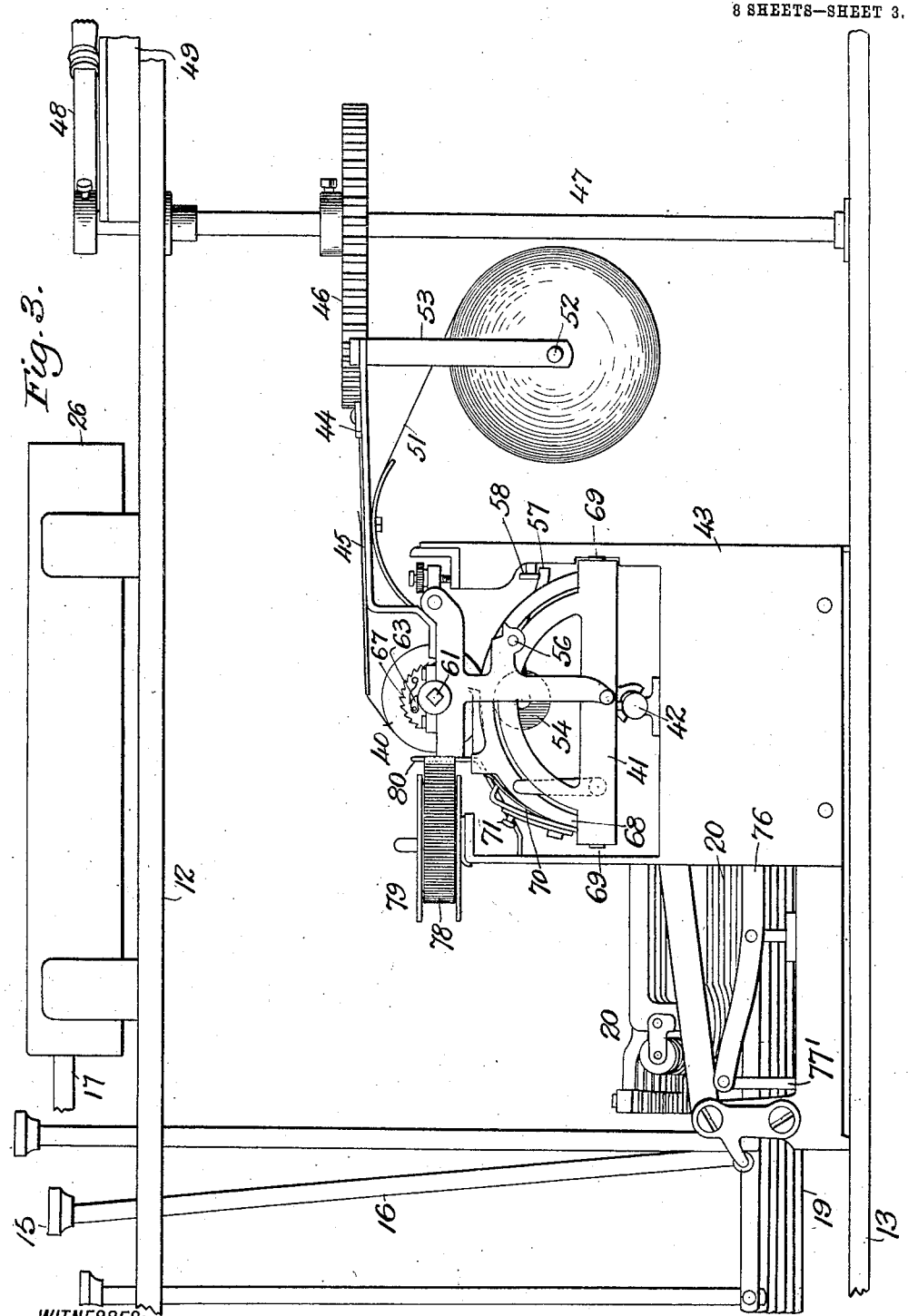
Figure 4:
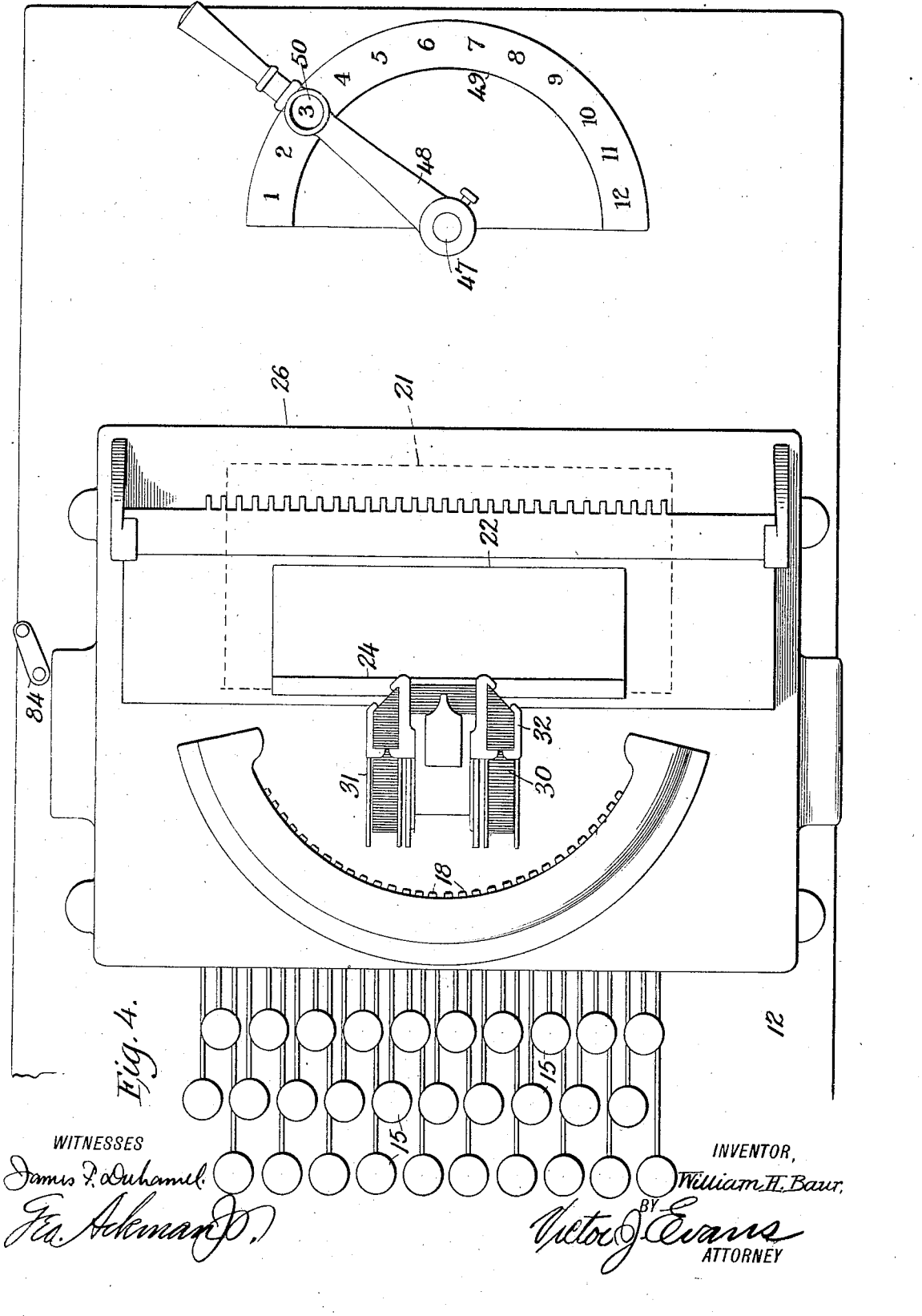
Figure 5:
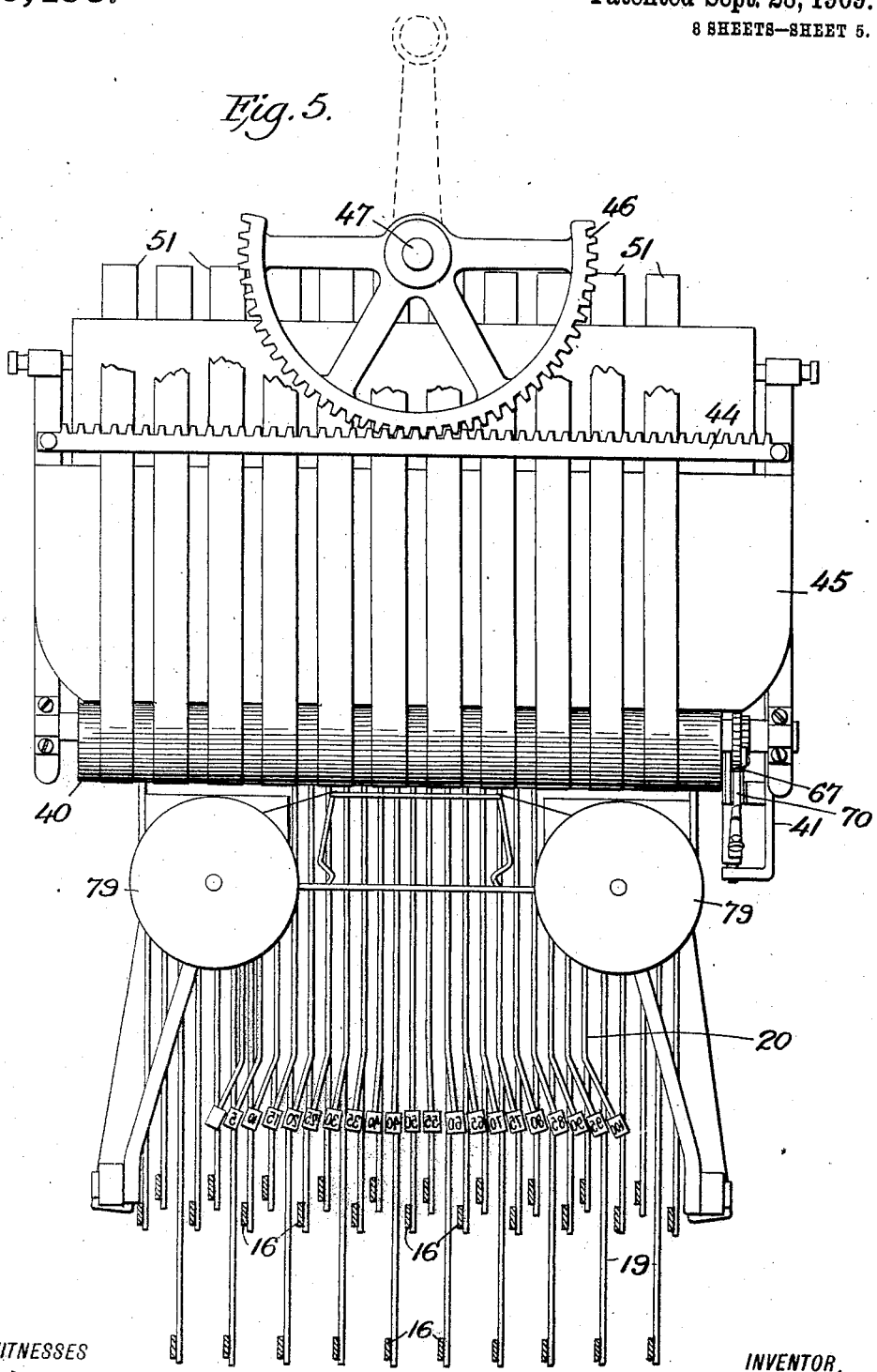
Figure 6:
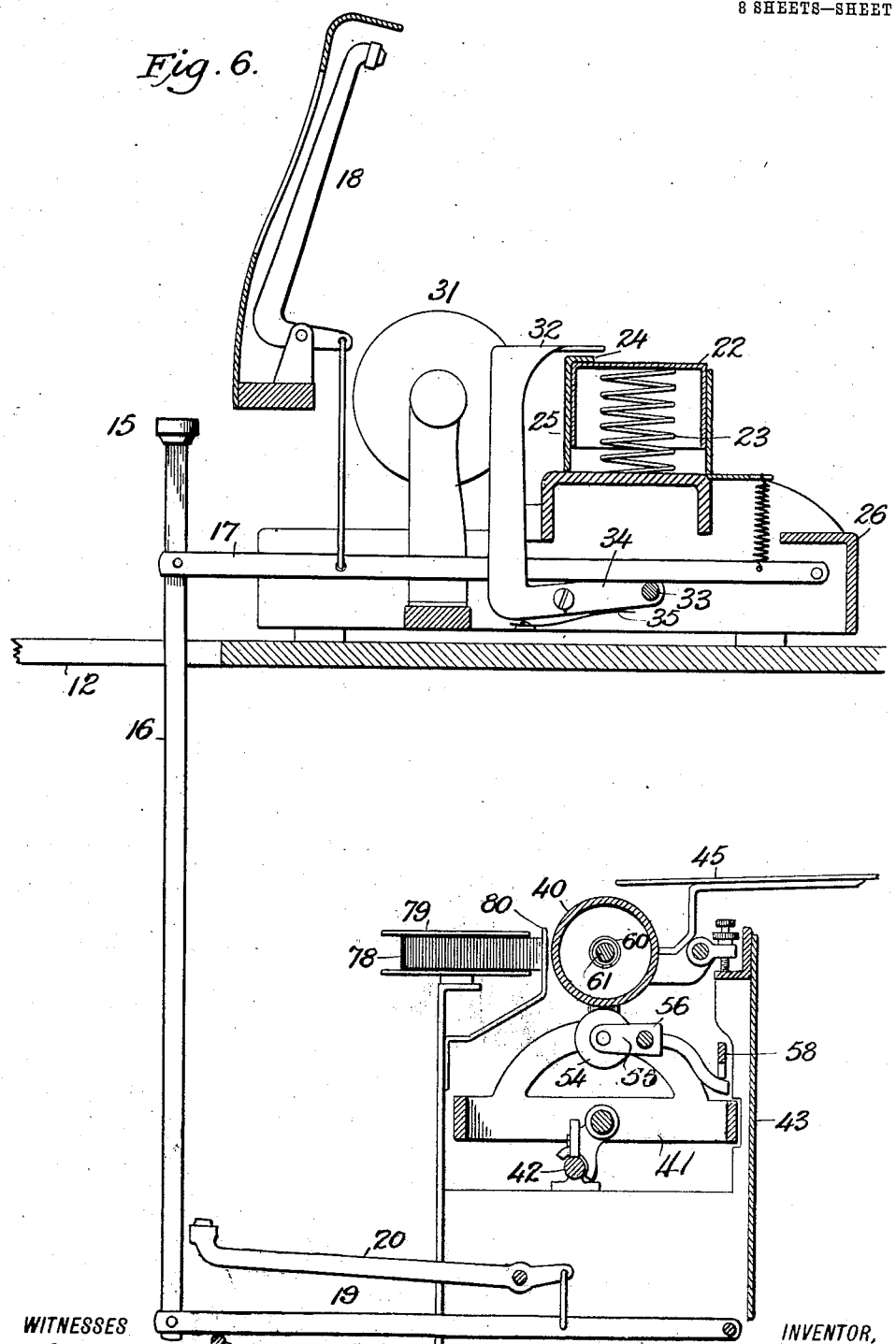
Figure 7:
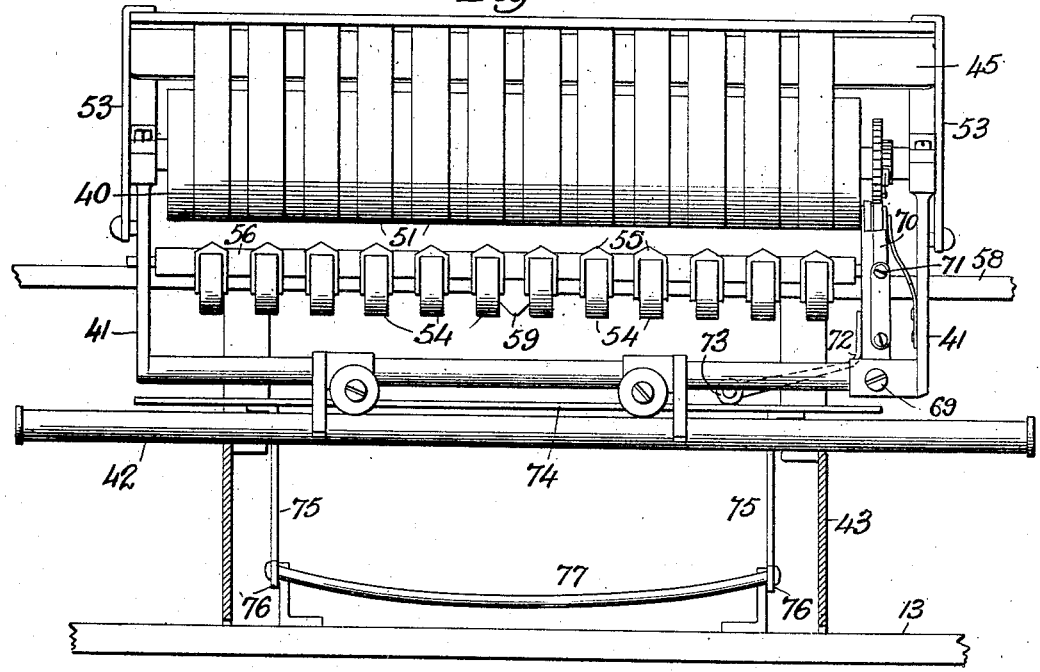
Figure 8:
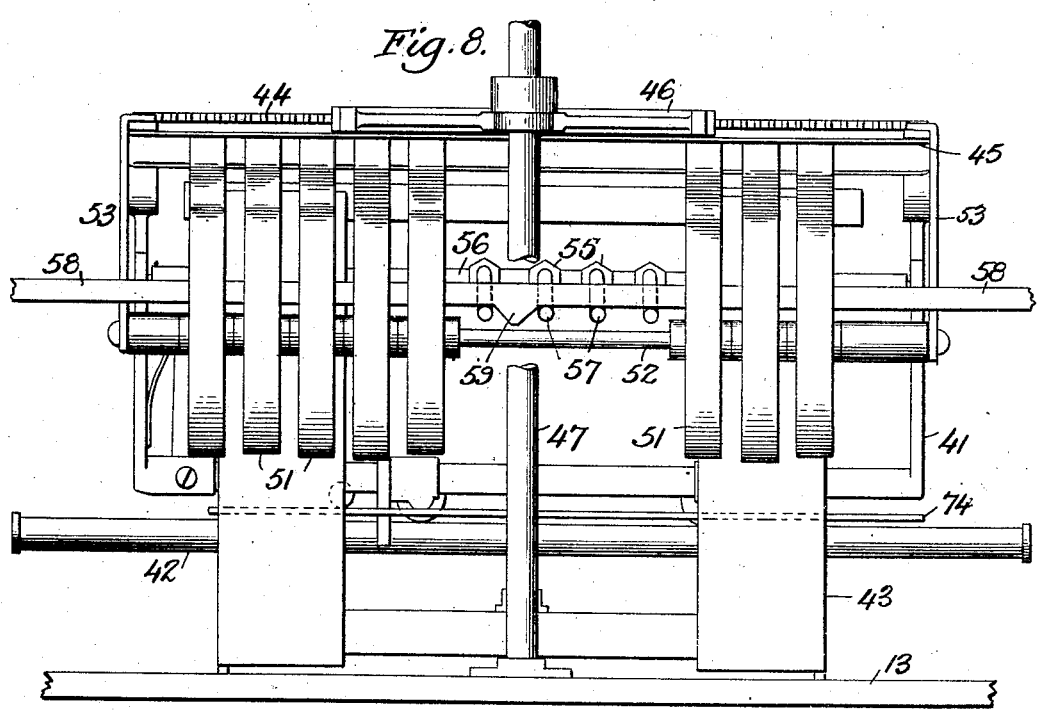
Figure 9:
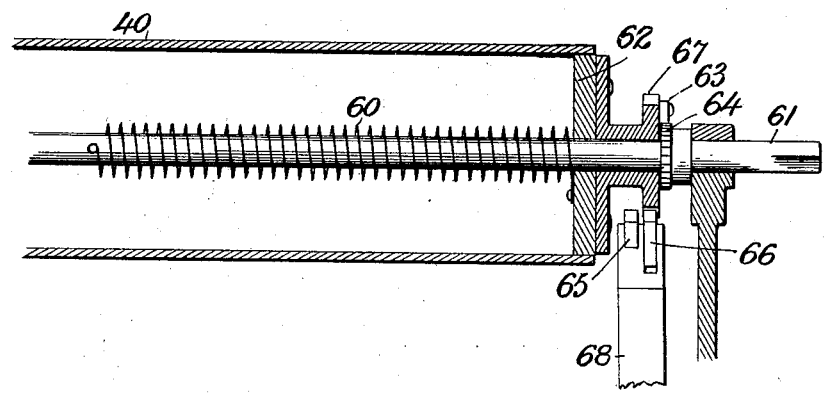
Figure 10:
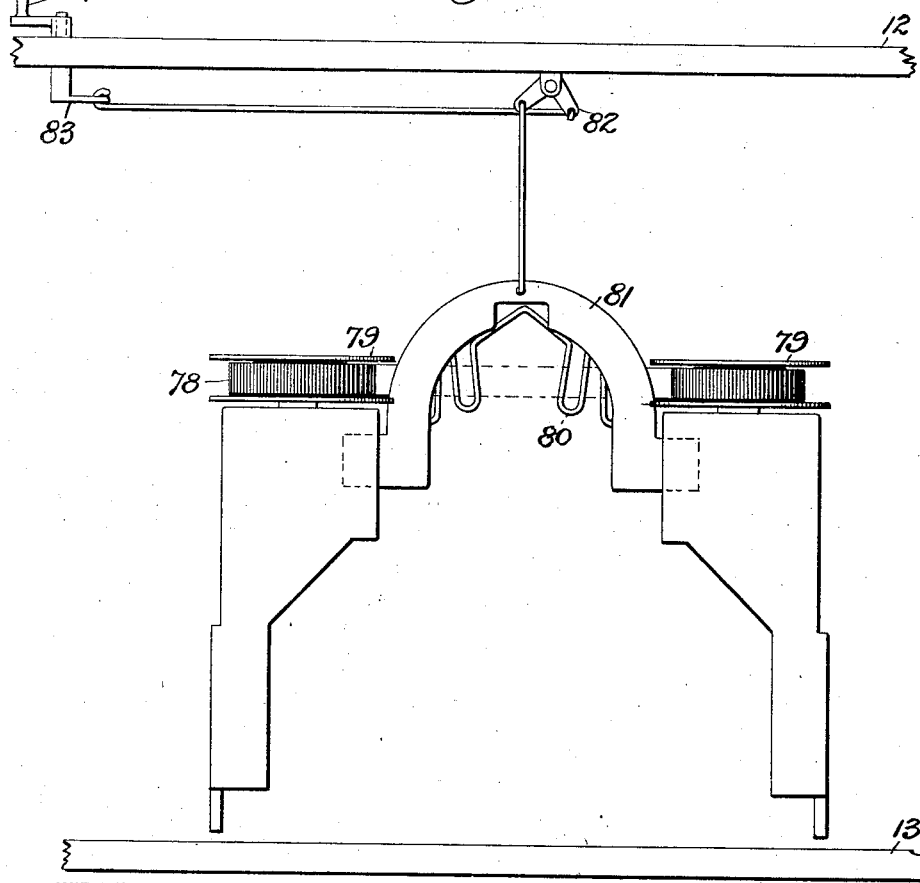

This invention relates to check printers and recorders and more especially to that class of machines wherein is placed a waiter's check having the name or arbitrary designation of said waiter after he has written the articles ordered thereon. The checker then by means of a novel arrangement of keys and type bars prints the prices of the articles on the check in their proper places and through certain connecting means an identical record is printed on a sheet or strip to contain the complete record for that special waiter. Means are provided for shifting or bringing into position the strip of any waiter so that his record will be added to with each check priced so that the aggregate orders or work of any waiter is readily obtainable. These and other details and objects of the invention are more fully described in the following specification, set forth in the claims and illustrated in the drawings, where:

Figure 1 is a side elevation of the complete device. Fig. 2 is an enlarged elevation of the upper part or check printer. Fig. 3 is a similar view of the lower part or waiter's recorder. Fig. 4 is a plan view of the check printer. Fig. 5 is a horizontal sectional view through the device showing the recorder in plan. Fig. 6 is a vertical longitudinal sectional view of the complete machine. Fig. 7 is a front view of the recorder carriage. Fig. 8 is a rear view of same. Fig. 9 is a sectional view of the recorder platen. Fig. 10 is a detail view of the recorder ribbon vibrator.

In this machine waiters' checks of any of the well known varieties may be used and these checks are generally made up in book or tablet form with space upon which the orders are written. After these orders are furnished from the kitchen and served the order or check is given to the checker who deposits it in the proper receptacle in the machine, which will be herein-after referred to, and the price is printed after each respective order by the checker and the total given. The check is then turned over to the waiter for collection.

Heretofore it has been customary for the checker to mark or stamp with dies the charges or cost opposite the different articles on the check and finally add up and total the whole cost on the check. At the same time he has spread before him a sheet separated in various blank columns each of which is adapted to receive the totals of the orders received by the different waiters and as the prices are stamped on the check they are in regular order stamped in the column of that special waiter on the sheet and at certain intervals these figures on the checks, which eventually find their way to the cashier, are compared but through certain irregularities and distractions are often found to be dissimilar. It is to overcome these irregularities, intentional and accidental, that this invention is designed, and the check is submitted to the checker for his verification and pricing and the total recording for each waiter and as this is done by him the machine at the same time reproduces the prices and costs on a sheet or slip against the waiter who presents the check for pricing so that the two records, the check and the record slip are identical and the aggregates must always agree.

The machine comprises two platforms 12 and 13 separated and held in their proper relative positions by the rods 14 the upper platform 12 supporting the check printer while the lower platform 13 carries the recorder.

At the front of the platform 12 are a series of keys 15 marked with certain numerals useful in printing and recording the charges above referred to and which actuate the key bars of both the printing and recording mechanisms simultaneously with one stroke, these keys and their bars 16 being connected with the levers 17 of the type bars 18 of the printer, and the levers 19 of the type bars 20 of the recorder so that as any key is struck its equivalent type bar in the two banks of type bars is actuated and both type strike and print at the same time.

The waiter's check 21, which is more clearly shown in dotted lines in Fig. 4 is supported on a yielding platform 22 forced upward by springs 23 and gripped by the overhanging flange 24 of the vertical plate 25 which holds it while the type are striking same. The waiter's check is fed lengthwise across the top of the platform 22 by the checker and each of its lines is centered for the striking of the key. This positioning is not in regular order as the items are often skipped and the check shifted from extreme points, for instance the first article is positioned and its price struck then it may be necessary to skip to some article near the bottom of the check.

The inking ribbon 30 is wound upon spools 31 and passes through a vibrating frame 32 which carries it forward over the platform 22 with each stroke of a key which causes one of the several levers 17 to bear upon the universal bar 33 passing from side to side of the frame 26 and each end being connected with the arm 34 of the frame 32, the latter being normally held in its retracted position by the spring 35. The ribbon is fed by the pawl 32' on the frame 32 rotating the ratchet and gear 31'. The mechanism operating this part of the machine is similar to the usual type of typewriting machines and the type are simply numerals, multiples of five, from zero to $1.00 or a similar arrangement of figures as may be found necessary. The type bars 18 are of the common type and are connected with the levers 17 by the links 36 while the type bars are pivoted in the uprights 37.

The recording mechanism is best shown in Figs. 3, 5, 7 and 8 where it will be seen that the type bars 20 are operated by the levers 19 connected with the lower ends of the type bars 16, and these type bars bear the identical numerals as the bars 18. The type bars 20 strike upon a rotating platen 40 which is shifted laterally with its carriage 41 along the rail 42 supported by the frame 43. This shifting is done by means best shown in Figs. 3 and 5 where it will be seen that a rack bar 44 is secured to the rear side of a table 45 at the upper end of the carriage 41. With this rack bar meshes a toothed segment 46 secured to an upright shaft 47 and having at its upper end a lever 48 traveling over a numbered segment 49 and having an opening 50 to register with one of the numbers on the segment so that when the lever 48 is turned to register with one of the numerals on the segment it shifts the rack bar 44 and the carriage 41 to a position indicated by the numeral. This shifting is done to carry a series of tapes 51 before the striking point of the key bars 20 and each of the tapes passes around the platen and is to carry the complete record of a separate waiter and when the check of that waiter is placed upon the platform 22. The tape rolls are carried on a rod 52 suspended from the table 45 by the hangers 53 and the tape is caused to move with the platen by the contact roller 54, one being provided for each tape and they are carried by yokes 55 loosely pivoted on a rod 56 and each having a rearwardly extending arm 57 to slide along the lower side of a bar 58 made fast to the frame 43 and in their normal position these rollers do not touch the platen or tape but when the carriage is shifted so that the indicating lever 48 covers one of the numerals on the segment 49 a corresponding arm 57 rides up and on a cam surface 59 at the central point of the recorder and directly opposite the type center. By this means but one tape at a time is pressed against the platen and remains so pressed as long as the check in the printer is receiving its charges.

The platen 40 is rotated by a coil spring 60 (Fig. 9) adapted to be wound about the shaft 61, to which it is attached at one end, the other end of the spring being secured to the head 62 of the platen so that when the shaft is rotated in the proper direction the spring is put under tension and urges the platen in a direction which will feed the tapes 51 so that they will receive the charges recorded on the check in the printer. When the shaft 61 is wound up the tension put upon the spring 60 is retained by means of the pawl 63 on the head engaging the ratchet 64 on the shaft, but the head and platen are released by the action of the dogs 65 and 66 on the escapement wheel 67, forming part of the head 62.

The dogs 65 and 66 are carried by a pivoted frame 68 rocking on pivots 69 in the carriage 41, the dog 65 being stationary while the dog 66 yields as in the common form of escapement used in step-by-step movements and is influenced by the spring 70 whose pressure is adjusted by means of the screw 71. The frame 68 is rocked by the arm 72 with the roller 73 at its end and which travels along the horizontal rail 74 as the carriage moves from side to side, and the rail 74 is connected by means of the vertical members 75 with the levers 76 carrying the universal 77 so that when the levers 38 are depressed the rear ends of the levers 76 are elevated and the frame 68 rocked so that the dogs permit the platen to revolve one line space to receive an additional figure on the tape which is at the same time moved forward by the partial rotation of the platen.

When the check on the printer has received all of its prices and the record tape for the corresponding waiter has simultaneously received the same charges another check may be inserted for pricing and if for another waiter the carriage would be shifted to bring the proper strip into play.

The inking ribbon 78 for the recorder is carried by the spools 79 and passes through a shifting frame 80 on the slide 81 which is connected by means of the bell crank lever 82 with a crank arm 83 journaled in the top platform 12 and having a handle 84 on the top side thereof. This latter detail is to provide for the adjustment of the frame 80 so that the type may strike on the upper edge of the ribbon or the lower, the ribbon being made up of several colors so that in the final recording the figures for the charges may be readily distinguishable so that the different charges may be apportioned to the different parts of the establishment, as for instance black figures may be written for the articles from the kitchen, red from the bar and blue for the cigar stand.

While the drawings illustrate a working machine and the preferred details of such a device it is obvious that minor details may be modified without departing from the essential features above referred to.

It is obvious that I do not confine the operation of this machine to the printing and recording of waiters' checks as the machine may be used in the listing and tabulating of merchandise, or articles placed in storage, invoices, or in many instances where the enumeration of articles are to be separated on different sheets and a tally of the whole is necessary.

The machine above described and shown in the drawings is capable of all such work or with slight alteration could be made to accomplish any similar work.

What I claim as new and desire to secure by Letters Patent is.

1. In a machine of the character described, the combination of a primary printing mechanism, a coöperating record printing mechanism, a series of record slips, a selecting mechanism for bringing one of the record slips into position for receiving the record, means for moving the check to any desired point under the primary printing mechanism, and means for simultaneously moving the selected record slip successively and actuated by the record printing mechanism.

2. In a machine of the character described, the combination of a primary printing mechanism, a coöperating record printing mechanism, a series of record slips, a selecting mechanism for bringing one of the record slips into position for receiving the record, and means for feeding the selected record slip only as the printing progresses.

3. In a machine for pricing and recording, the combination with a transversely movable platform adapted to receive a bill to be priced, of type bars, a carriage with longitudinally moving rolls of record slips, a rotating platen, a second series of type bars, and keys adapted to operate the corresponding type bars of the two series in unison.

4. In a machine for pricing bills and recording same, the combination with separate platforms, of type bars and a laterally moving bill holder on one of the platforms a second series of type bars and rotating record carrier on the second platform and keys connected with both series of type bars to cause them to work in unison.

5. In a bill pricing and recording machine, the combination with separate platforms adapted to carry differently operative paper carriers, of a stationary bill holder on the upper platforms, a series of type bars on same, a carrier with record slips arranged in rolls on the lower platform, a moving platen, means for feeding the slips, a second series of type bars to print on the record slips and a series of keys to operate the two series of type bars and connecting same.

6. In a bill printer and recorder, the combination with superimposed stationary platforms, of a stationary bill carrier on the upper platform, a series of type bars with numerals, an inking ribbon, a carrier for rolls of record tape on the lower platform, a rotating platen, a second series of type bars having numerals identical with the first series, an inking ribbon for same, and one set of keys operating identical type bars in the two series.

7. In a bill printer and recorder, the combination with upper and lower stationary platforms, of a carrier on the upper platform adapted to hold the bills to be priced, an inking ribbon, a vibrator, type bars with numerals, a second set of type bars on the lower platform with identical numerals, a carrier with record tapes, a rotating platen on the carrier, and means for operating the type bars simultaneously and moving the carriage.

8. In a bill printer and recorder, the combination with stationary upper and lower platforms, of a stationary platen on the upper platform an inking ribbon, a horizontal vibrator, type bars carrying numerals, a rotating platen on the lower platform, a laterally shifting carriage for same, with record tapes passing over the rotating platen, a second series of type bars with numerals identical with the first series, means for rotating the platen, means for shifting the carriage, and keys adapted to operate the two series of keys simultaneously.

9. In a check printer and recorder, the combination with the upper and lower platforms, of a check holder on the upper platform, type bars operating on same, a ribbon carrier, a rotating platen on the lower platform, a shifting carriage with a rack bar for same, a vertical shaft with gear wheel to mesh with the rack bar, an arm at the upper end of the shaft and above the upper platform, and a sector with characters over which the arm passes.

10. In a check printer and recorder, the combination with superimposed platforms, of a check holder and printer on one of the platforms, type bars, an indicator arm and characters to designate its position, a spring rotated platen on the other platform, means for controlling the rotation of the platen, a shifting carriage for the platen, means connected with the indicator arm for shifting the carriage, type bars operating on the platen, and keys operating the two sets of type bars simultaneously.

11. In a check printer and recorder, the combination with superimposed platforms, of a series of type bars with identical numerals for each platform, vertical keys connecting the two series of type bars, a check holder on one of the platforms, a hollow platen on the other platform, a spring within same to rotate it, a carriage for the platen, an escapement mechanism to control the rotation of the platen, intermediate means between the key bars and the escapement mechanism to operate the latter.

12. In a check printer and recorder, the combination with an upper and lower platform, of a stationary platen on the upper platform for the check, a rotating platen on the lower platform for printing a record, a shifting frame carrying the platen and record tapes, an indicating arm above the upper platform for shifting the frame, two sets of type bars with identical numerals for printing on the check and the record tapes, a single set of key bars for operating the two sets of type bars, and means operated by the key bars for rotating the lower platen.

In testimony whereof I affix my signature in presence of two witnesses.

WILLIAM H. BAUR.

Witnesses:
 CHARLES MÜLLER,
 JAMES F. DUHAMEL.